Jan. 13, 1942.   J. L. CONLON   2,270,036
BACK WINDOW INSTALLATION
Filed Oct. 16, 1939   2 Sheets-Sheet 1

INVENTOR.
JAMES L. CONLON.
BY Barnes, Kisselle, Laughlin & Raisch
ATTORNEYS.

Jan. 13, 1942. J. L. CONLON 2,270,036
BACK WINDOW INSTALLATION
Filed Oct. 16, 1939 2 Sheets-Sheet 2
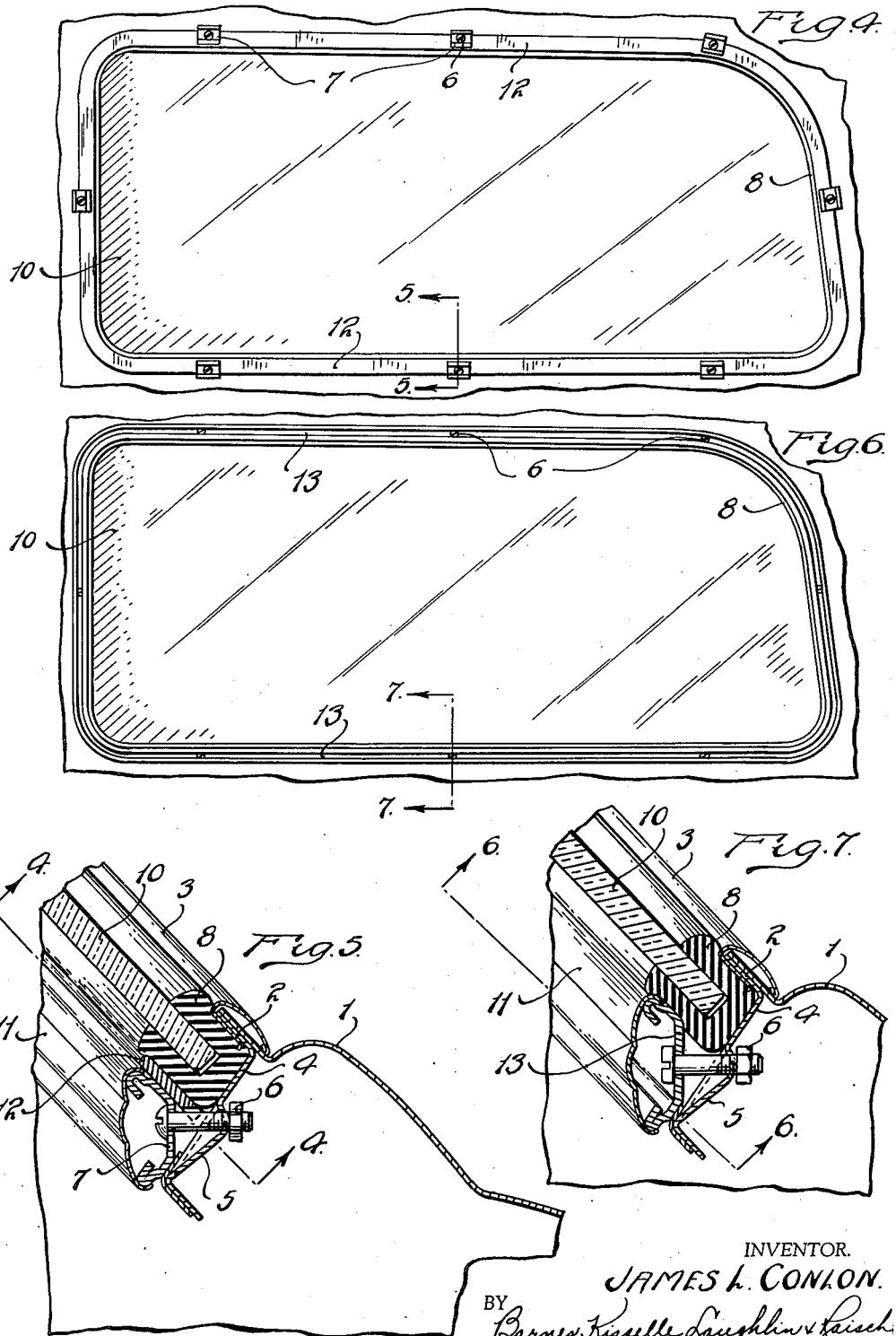
INVENTOR.
JAMES L. CONLON.
BY
Barnes, Kisselle, Laughlin & Raisch
ATTORNEYS.

Patented Jan. 13, 1942

2,270,036

UNITED STATES PATENT OFFICE 2,270,036

BACK WINDOW INSTALLATION

James L. Conlon, Detroit, Mich., assignor to Ternstedt Manufacturing Company, Detroit, Mich., a corporation of Michigan Application October 16, 1939, Serial No. 299,667

1 Claim. (Cl. 296—145)

This invention relates to window installations, particularly the rear windows or back lights of automobile bodies. It is the object of the invention to provide means for holding the back light in position and also for weather-sealing the glass.

In the drawings:

Fig. 4 is a section on the line 4—4 of Fig. 5 showing another form of the invention.

Fig. 5 is a cross section of the same.

Fig. 6 is a section on the line 6—6 of Fig. 7.

Fig. 7 is a cross section of this modified form of the invention.

Figure 1:
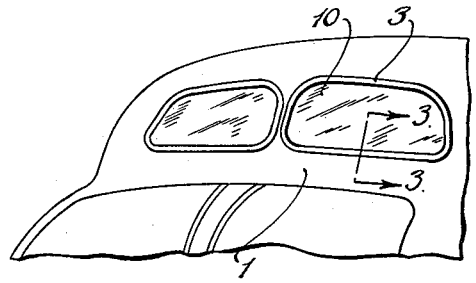
Figure 1 is a fragmentary elevation of an automobile body equipped with rear windows.
Figure 2:
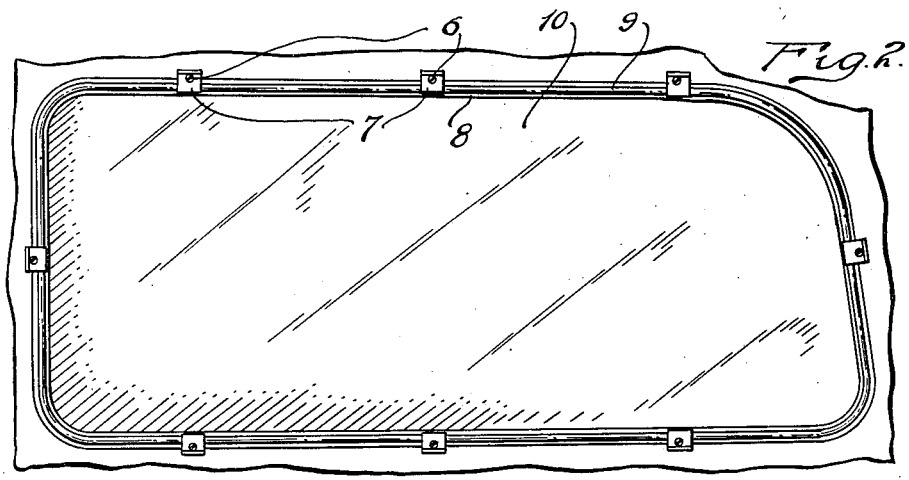
Fig. 2 is an inside elevation of one form of holding device with the garnish molding removed. This is taken on the line 2—2 of Fig. 3.
Figure 3:
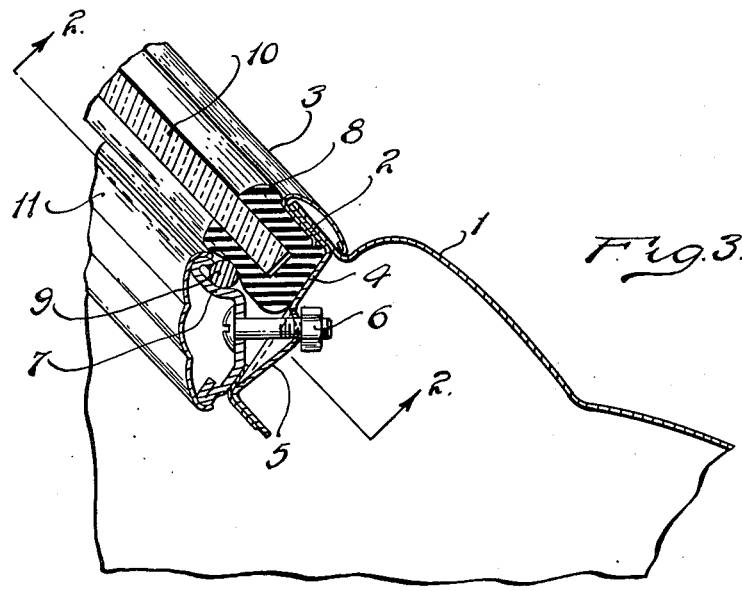
Fig. 3 is a cross section through the same.

Referring to the form of the invention shown in Figs. 1, 2 and 3: The outer panel 1 has a window stop portion 2 over which is slipped the reveal molding 3 which is ordinarily chromium-plated. 4 is the window seat which is a separate piece that is welded to the window stop portion of the outer panel. This window seat member 4 is provided with struck in portions 5 to receive metal drive screws 6 which hold in place the clips 7. The rubber channel 8 forms a seal for the glass panel 10. When the screws tighten the clips 7 against the rod-like frame 9, this frame bites into the rubber and makes a weathertight seal on the inside and it also drives the rubber weather channel 8 against the window stop and reveal molding, forming a tight seal. The spring garnish molding 11 may be snapped over the beaded or turned over edges of the clips to complete the finish around the window on the inside of the body.

In the form of the invention shown in Figs. 4 and 5, in place of an endless rod-like frame, the heavy metal bar frame 12 is used. Otherwise, the construction is identical.

In Figs. 6 and 7, in place of clips, a frame 13 having the same cross section as the clips is extended all the way around the back window and the clips and frame are united in one member.

What I claim is:

A window installation having in combination with an outside window stop and a window seat, a glass panel, a deformable rubber weatherstrip surrounding the edge of the panel, a frame having beaded edges spaced from the rubber and a heavy portion bearing against the inside of said weatherstrip, means for forcing the frame into the weatherstrip and the weatherstrip against the window stop and a garnish molding arranged to snap over the beaded edges of the frame to be held in place by spring action.

JAMES L. CONLON.